US011159371B1

(12) United States Patent  
Mandal et al.

(10) Patent No.: US 11,159,371 B1
(45) Date of Patent: Oct. 26, 2021

(54) NETWORK NODE CLUSTERING

(71) Applicant: FUJITSU LIMITED, Kawasaki (JP)

(72) Inventors: Avradip Mandal, San Jose, CA (US);
Arnab Roy, Santa Clara, CA (US);
Sarvagya Upadhyay, San Jose, CA
(US); Hayato Ushijima-Mwesigwa,
San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/953,179

(22) Filed: Nov. 19, 2020

(51) Int. Cl.
*G06F 15/173* (2006.01)
*H04L 12/24* (2006.01)

(52) U.S. Cl.
CPC ...... *H04L 41/0813* (2013.01); *H04L 41/0823* (2013.01)

(58) Field of Classification Search
CPC .............. H04L 41/0813; H04L 41/0823
See application file for complete search history.

(56) References Cited

U.S. PATENT DOCUMENTS

| 11,036,737 | B2* | 6/2021 | Chainani | ............. | G06F 16/2237 |
| 2014/0047084 | A1* | 2/2014 | Breternitz | ........... | H04L 67/1008 |
| | | | | | 709/221 |
| 2019/0121890 | A1* | 4/2019 | Chainani | ........... | G06F 16/24537 |
| 2020/0401340 | A1* | 12/2020 | Johri | ..................... | G06F 3/0631 |

OTHER PUBLICATIONS

Ushijima-Mwesigwa, H., Negre, C. F., & Mniszewski, S. M. (Nov. 2017). Graph partitioning using quantum annealing on the D-Wave system. In Proceedings of the Second International Workshop on Post Moores Era Supercomputing (pp. 22-29).
Blondel, Vincent D., et al. "Fast unfolding of communities in large networks." Journal of statistical mechanics: theory and experiment 2008.10 (2008): P10008.
Shaydulin, Ruslan, Hayato Ushijima-Mwesigwa, Ilya Safro, Susan Mniszewski, and Yuri Alexeev. "Network community detection on small quantum computers." Advanced Quantum Technologies 2, No. 9 (2019): 1900029. May 12, 2019.
Negre CFA, Ushijima-Mwesigwa H, Mniszewski SM (2020) Detecting multiple communities using quantum annealing on the D-Wave system. PLOS One 15(2): e0227538 Feb. 13, 2020.
Ushijima-Mwesigwa, H., Shaydulin, R., Negre, C. F., Mniszewski, S. M., Alexeev, Y., & Safro, I. (2019). Multilevel combinatorial optimization across quantum architectures. arXiv preprint arXiv:1910.09985. Oct. 22, 2019.

(Continued)

*Primary Examiner* — Thanh T Nguyen
(74) *Attorney, Agent, or Firm* — Maschoff Brennan

(57) ABSTRACT

A method may include assigning each node of a first network to a different node cluster such that a number of nodes equals a number of node clusters, selecting multiple nodes of the first network as a set of nodes, and selecting multiple node clusters as a set of node clusters. The method may also include solving a first optimization problem by reassigning one or more of the nodes of the set of nodes to different node clusters of the set of node clusters while maintaining assigned node clusters of the nodes that are not part of the set of nodes and after reassigning one or more of the nodes of the set of nodes to different node clusters, merging the nodes assigned to at least one of the node clusters to form a second network with fewer nodes than the number of nodes of the first network.

20 Claims, 5 Drawing Sheets

(56) References Cited

OTHER PUBLICATIONS

Newman, Mark EJ. "Modularity and community structure in networks." Proceedings of the national academy of sciences 103.23 (2006): 8577-8582.
Liu, Xiaoyuan, et al. "On Modeling Local Search with Special-Purpose Combinatorial Optimization Hardware." arXiv preprint arXiv:1911.09810 (2019). NPL 7 Nov. 22, 2019.
Noack, Andreas, and Randolf Rotta. "Multi-level algorithms for modularity clustering." International Symposium on Experimental Algorithms. Springer, Berlin, Heidelberg, 2009.
Traag, Vincent A., Ludo Waltman, and Nees Jan van Eck. "From Louvain to Leiden: guaranteeing well-connected communities." Scientific reports 9.1 (2019): 1-12. Mar. 26, 2019.
Clauset, Aaron, Mark EJ Newman, and Cristopher Moore. "Finding community structure in very large networks." Physical review E 70.6 (2004): 066111.
Girvan, Michelle, and Mark EJ Newman. "Community structure in social and biological networks." Proceedings of the national academy of sciences 99.12 (2002): 7821-7826.

\* cited by examiner

NETWORK NODE CLUSTERING

FIELD

The embodiments discussed in the present disclosure are related to clustering of nodes in networks.

BACKGROUND

Networks may be represented by nodes and edges between the nodes. The nodes may be clustered. Clustered nodes may be used for data analysis in many fields. For example, biological and social patterns, the World Wide Web, metabolic networks, food webs, neural networks, and pathological networks, among others may be studied using clustered nodes.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

In an example embodiment, a method may include assigning each node of a first network to a different node cluster such that a number of nodes equals a number of node clusters. The method may further include selecting multiple nodes of the first network as a set of nodes and selecting multiple node clusters as a set of node clusters. The method may also include solving a first optimization problem by reassigning one or more of the nodes of the set of nodes to different node clusters of the set of node clusters while maintaining assigned node clusters of the nodes that are not part of the set of nodes and after reassigning one or more of the nodes of the set of nodes to different node clusters, merging the nodes assigned to at least one of the node clusters to form a second network with fewer nodes than the number of nodes of the first network.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
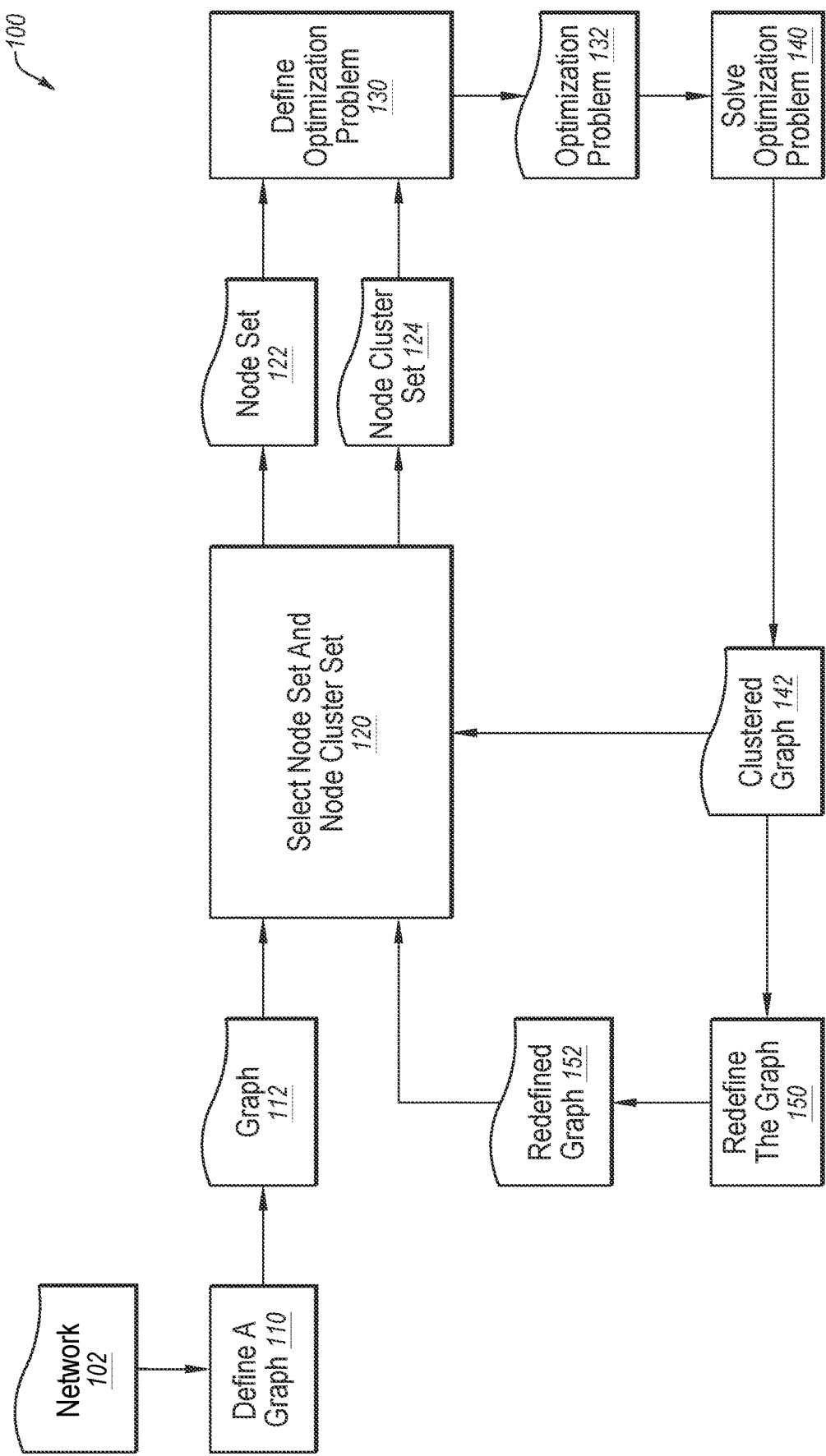
FIG. 1 illustrates an example operational flow for grouping nodes of a network.

With the growth of technology and understanding, more complex systems are being analyzed. For example, complex systems such as social networks, neural networks, pathological networks, and biological networks among other type of networks may be analyzed. Example biological networks may include chemical networks, such as chemical structures of organisms. The analysis of the networks may involve representing the networks as graphs with nodes and edges connecting the nodes. After representing the networks as graphs, the graphs may be analyzed. Analysis of the graphs may include community detection. Community detection may involve grouping the nodes in node clusters. The nodes that may be grouped in node clusters may be nodes with a higher density of edges therebetween than with other nodes. Community detection within graphs may reveal underlying structures within the graphs and thus networks represented by the graphs. For example, in social networks, community detection may reveal a friend group. As another example, in biological networks, community detection may reveal similar proteins.

Grouping nodes in node clusters for community detection may be a type of a combinatorial optimization problem. In some instances, grouping nodes in node clusters may involve a user specifying a number of communities or clusters into which nodes should be grouped. However, in some circumstances, specifying a number of communities may be suboptimal as some communities that may otherwise be discoverable in the graphs may not be discovered.

Some embodiments in this disclosure may relate to systems and/or methods that may be configured to group nodes into node clusters. The node clusters may be used for community detection. In these and other embodiments, the systems and/or methods may be configured to group nodes into node clusters regardless of the size of the graph and the hardware capability of solvers that are performing calculations to group nodes into the node clusters. Alternately or additionally, the systems and/or methods may be configured to group nodes into node clusters without obtaining a user specified number of node clusters for the graph. In these and other embodiments, the systems and/or methods may be configured to use relationships between nodes of the graph to determine a number of node clusters into which nodes may be grouped.

In some embodiments, the systems and/or methods may be configured to group nodes of a graph into node clusters by assigning each node of a first network to a different node cluster such that a number of nodes equals a number of node clusters. After assigning each node to a different node cluster, multiple nodes may be selected as a set of nodes and multiple nodes clusters may be selected as a set of node clusters. The number of nodes in the set of nodes may be selected based on the hardware capability of solvers used by the systems and/or methods in this disclosure.

After obtaining the set of nodes and the set of node clusters, a first optimization problem may be solved by reassigning one or more of the nodes of the set of nodes to different node clusters of the set of node clusters while maintaining assigned node clusters of the nodes that are not part of the set of nodes. The process of assigning a set of nodes and a set of node clusters and solving a first optimization problem may be iterated until a change in modularity of the graph between subsequent iterations satisfies a threshold.

In response to the threshold being satisfied, the nodes of each of the node clusters may be merged into a single node to form a second graph. For example, the nodes of a first node cluster may be merged into a first node and the nodes of a second node cluster may be merged into a second node. After the merging, the process of assigning a set of nodes and a set of node clusters from the second graph and solving a first optimization problem may be iterated until a change in modularity of the second graph between subsequent iterations satisfies the threshold. The process of merging and assigning a set of nodes and a set of node clusters from a subsequent graph and solving a first optimization problem may be iterated to continue to group the nodes into node clusters.

The system and/or methods described in this disclosure thus provide a manner for community detection in large networks using special-purpose hardware, such as an Ising processing unit, without a user defined number of communities. Thus, the system and/or methods described in this disclosure provide a novel technical solution to the technical problem of community detection in large networks. Thus, the system and/or methods described in this disclosure provide a practical application with respect to community detection that provides a meaning advancement in the technology of analyzing networks.

FIG. 1 illustrates an example operational flow 100, according to at least one embodiment in the present disclosure. The operational flow 100 may illustrate an operational flow for grouping nodes of a network into node clusters. For example, the operational flow 100 may include multiple operations that may be configured to group nodes from a network 102 into node clusters.

In some embodiments, at operation 110 a graph 112 may be defined based on the network 102. The network 102 may be any type of network that includes connected elements. For example, the network 102 may be a social network, a neural network, a pathological network, or a biological networks, among other types of networks.

At operation 110, a graph 112 may be defined that models the network 102. For example, the elements of the network 102 may be defined as nodes of the graph 112. The connections between the elements of the network 102 may be defined as edges of the graph 112. Each of the nodes of the graph 112 may be connected to at least one other node of the graph 112 by an edge of the graph 112.

In some embodiments, the edges of the graph 112 may be associated with values that correspond to the connection between the elements in the network 102. For example, an edge between two nodes in the graph 112 may be associated with a value between zero and one. Alternately or additionally, the value may be any number. In some embodiments, all of the edges may have similar values. Alternately or additionally, all of the edges may have different values or some of the edges may have the same values and some of the edges may have the different values.

In some embodiments, the value may indicate a relationship between the two nodes in the graph 112. For example, if the network 102 was a social network, the elements of the social network may be individuals in the social network. As such, a node in the graph 112 may represent an individual. The edge in the graph 112 between the node and another node may represent a relationship between the individual and another individual in the social network. As the individual may have varying relationship with different individuals in the social network, the edges between different nodes may have varying weights.

Figure 2B:
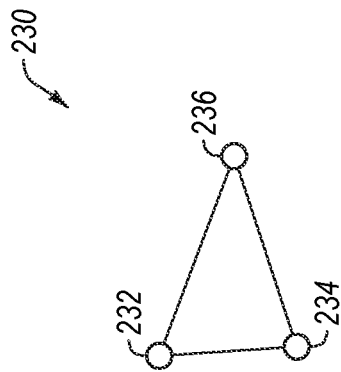
FIG. 2b illustrates another example network.
Figure 2C:
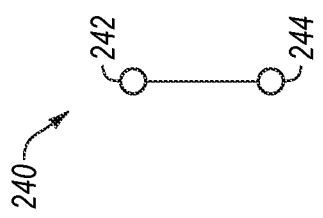
FIG. 2c illustrates another example network.
Figure 2A:
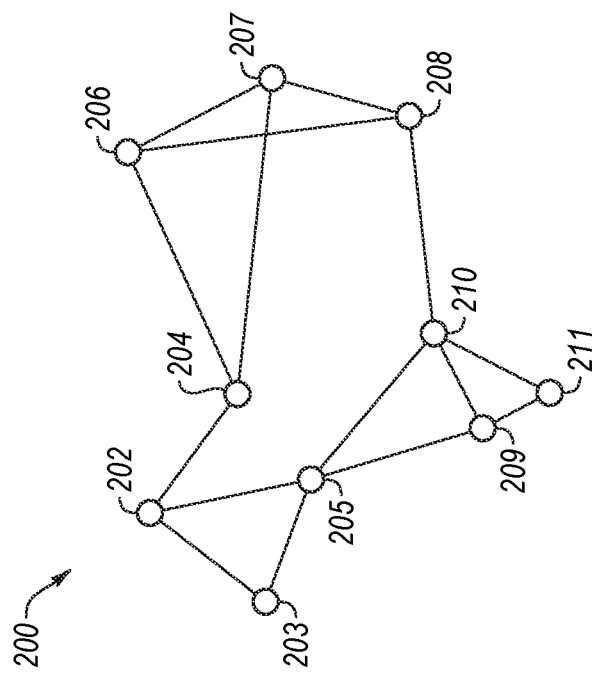
FIG. 2a illustrates an example network.

An example of the graph 112 is illustrated in FIG. 2a by the graph 200. The graph 200 includes nodes 202-211 that are coupled by edges represented by the lines between the nodes 202-211. Each of the nodes 202-211 are coupled to at least one other of the nodes 202-211 by an edge. Some of the nodes 202-211 are coupled to multiple nodes of the nodes 202-211.

Returning to a discussion of FIG. 1, at operation 110, node clusters of the graph 112 may also be defined. In these and other embodiments, for the graph 112 initially defined based on the network 102, each of the nodes in the graph 112 may be defined as a node cluster. As such, a number of node clusters of the graph 112 may be equal to the number of nodes of the graph 112.

At operation 120, a node set 122 and the node cluster set 124 may be selected based on a graph provided to the operation 120. During an initial operation of the operational flow 100, the operation 120 may use the graph 112. During subsequent operations of the operational flow 100 as discussed later in this disclosure, the operation 120 may use a redefined graph 152 generated by the operational flow 100 that is based on the graph 112.

In some embodiments, the size of the node set 122, that is a number of nodes included in the node set 122, may be selected based on capabilities of hardware used during the operation 140 during the operational flow 100. For example, the hardware may be specialized hardware that operates to solve optimization problems, such a quadratic unconstrained binary optimization problems. An example of the specialized hardware is a digital annealing unit by Fujitsu.

In some embodiments, the hardware may include a limited number of variables that may be considered when solving an optimization problem. The network 102 and as a result, the graph 112 may be such a size that the number of nodes, and as such a number of variables in the optimization, may be too large for the specialized hardware. For example, to solve a node clustering problem, such as a community detection problem, specialized hardware may not be able to accommodate a large network or a large network may result in a run-time that may not be practical. In these and other embodiments, the size of the node set 122 may be selected such that the number of variables in the optimization problem is able to be solved by the specialized hardware and/or a solution may be obtained within a particular time frame.

In some embodiments, the size of the node set 122 may be such that the node set 122 include all of the nodes of the graph 112. Alternately or additionally, the size of the node set 122 may be such that the node set 122 includes only a portion of the nodes of the graph 112.

In some embodiments, the nodes of the graph 112 to include in the node set 122 may be selected randomly. Alternately or additionally, the nodes selected to include in the node set 122 may be selected by a sliding window strategy where a subsets of nodes that are consecutive arranged in a sorted list of the nodes are selected. A subset of nodes is selected for inclusion based on randomly or pseudo-randomly shifting the location within the list for selection of the nodes.

Alternately or additionally, the nodes selected to include in the node set 122 may be selected based on a breadth first search of the graph 112. In these and other embodiments, a node may be selected from a list of the nodes for inclusion in the node set 122. Those nodes that are connected to the selected node based on the breadth first search may also be included in the node set 122. Additional nodes that are connected to the nodes connected to the selected node may also be added to the node set 122 based on the breadth first search of the selected node.

In some embodiments, the node clusters to include in the node cluster set 124 may be selected based on the nodes in the node set 122. In some embodiments, the node clusters of each of the nodes in the node set 122 may be included in the node cluster set 124. Alternately or additionally, additional node clusters, such as node clusters within a particular number of edges of the node clusters in the node cluster set 124 based on a breadth first search of the graph 112 may also be included. As a result, a number of node clusters in the node cluster set 124 may be greater than a number of nodes in the node set 122.

Alternately or additionally, the node clusters to include in the node cluster set 124 may be selected based on the nodes in the node set 122 and the arrangement of the nodes in the node set 122 in the graph 112 with respect to the node clusters. In these and other embodiments, for each node in the node set 122 a particular number of node clusters for which an increase in modularity for the graph 112 is highest may be selected for inclusion in the node cluster set 124. For example, for a first node, up to three neighboring node clusters may be included in the node cluster set 124. The three node clusters for may be selected based on the three node clusters being a neighbor of the first node and a modularity of the graph 112 increasing more by grouping the first node with the three node clusters as compared to grouping the first node with other neighboring nodes.

A modularity of the graph 112 may indicate a measure of a structure of the graph 112. Graphs with high modularity may include dense connections between nodes grouped together and sparse connections between nodes not grouped together. A measure of modularity may be used during the operational flow 100 as an optimization problem to be solved to group nodes together to determine communities in the graph 112 and thus the network 102.

As an example implementation, for a first node in the node set 122, the neighboring node clusters may be determined. For each neighboring node cluster, a modularity of the graph 112 may be determine in response to grouping the first node with each of the neighboring node clusters. A particular number of the neighboring node clusters with the highest increase in modularity may be included in the node cluster set 124. As a result, a number of node clusters in the node cluster set 124 may be greater than a number of nodes in the node set 122.

In some embodiments, in response to only one node cluster being selected for a node of the node set 122 when selecting the node clusters for the node cluster set 124, the node may be removed from the node set 122 and assigned to the one node cluster. As such, the node may not be reassigned to different node clusters during operation 140 when the optimization problem is solved.

At operation 130, an optimization problem 132 may be defined using the node set 122 and the node cluster set 124. In some embodiments, the optimization problem 132 may be a modularity maximization problem. Alternately or additionally, the optimization problem 132 may be a Euclidian distance minimization problem. Alternately or additionally, the optimization problem 132 may be another type of optimization problem that may be used to determine communities in a graph.

As an example, to solve the modularity maximization problem, the nodes in the node set 122 may be assigned to different node clusters in the node cluster set 124 to maximize the modularity of the graph 112. The solution may result in reassignment of one or more nodes of the node set 122 to different node clusters of the node cluster sets 124. For example, a first node may be assigned to a first node cluster as defined in the operation 120. The solution of the modularity maximization problem may reassign the first node to a second node cluster. As a result, the second node cluster may include the first node and one or more second nodes.

The solution to the modularity maximization problem may result in assignment of each of the nodes in the node set 122 to one and only one of the node clusters in the node cluster set 124. To increase the modularity, one or more of the node clusters in the node cluster set 124 may include assignment of multiple nodes from the node set 122. Note that while solving the modularity maximization problem, the nodes that are not part of the node set 122 may not receive different node cluster assignments. Rather, the node clusters of the nodes that are not part of the node set 122 may be held static while solving the modularity maximization problem.

In some embodiments, an optimization problem may be difficult to solve. However, other optimization problems may be solved using hardware. For example, a quadratic unconstrained binary optimization (QUBO) problem may be solved using hardware. In some embodiments, at operation 130 a formulation of an optimization problem in a framework of a QUBO problem may be constructed as the optimization problem 132. The construction may be performed using the node set 122, the node cluster set 124, and the graph 112. In these and other embodiments, the optimization problem being a formulation of the QUBO problem may indicate that the optimization problem is constructed using variables for solving the optimization problem in the QUBO framework such that the optimization problem 132 generates a solution that is an approximate solution.

The following is an example a formulation of a modularity maximization problem in a framework of a QUBO problem, however, other optimization problems may also be formulated in a framework of a QUBO problem.

In some embodiments, a modularity maximization problem with may be defined as follows:

$$Q = \frac{1}{2m} \sum_{i,j} \left[ A_{i,j} - \frac{k_i k_j}{2m} \right] \delta(c_i, c_j)$$

where A is an adjacency matrix that represents the graph 112, k is a vector, where $k_i = \Sigma_j A_{i,j}$ and where $k_1 = \Sigma_i A_{i,j}$ such that $k_i$ and $k_j$ are summations of the values of the edges that are connected to node i and j, respectively, $$m = \frac{1}{2} \sum_{i,j} A_{i,j} \delta(u, v)$$

and δ(u, v) is equal to 1 if u=v and is otherwise equal to zero.

In some embodiments, a QUBO problem may be defined as:

$$H(x) = \sum_{i<j} Q_{i,j} x_i x_j + \sum_i Q_{ii} X_i \text{ with } x \in \{0, 1\}$$

To create a QUBO that is a formulation of the modularity maximization problem of the graph 112 where only the nodes of the node set 122 are considered with respect to the node clusters of the node cluster set 124, the modularity maximization problem may be reformulated to the form of the QUBO. To reformulate the modularity maximization problem to the form of the QUBO, the equation for the modularity maximization problem is reformulated by introducing additional variables while seeking to maintain the modularity maximization problem. For example, the equation for the modularity maximization problem may be simplified for two node clusters, such that each node of the graph belongs to a node cluster C or does not. The below equation is the simplified equation of the modularity maximization problem from above $$Q = \frac{1}{4m} \sum_{i,j} s_i \left[ A_{i,j} - \frac{k_i k_j}{2m} \right] s_j$$

where s is a vector of binary variables from the set of 1 and −1 that indicates whether nodes belong to a cluster C. The simplified equation above may be changed to minimization by negating the equation. Additionally, the coefficient of ¼m may be removed without altering the optimization problem to form the following:

$$s^T \left( \frac{1}{2m} \mathbb{K}\mathbb{K}^T - A \right) s$$

Additionally, the binary variables of 1 and −1 may be converted to the set of 0 and 1. As a result, the following equation results:

$$x^T \left( \frac{1}{2m} \mathbb{K}\mathbb{K}^T - A \right) x + O(1) \text{ where } x_i \in \{0, 1\}$$

After removing the constants and apply a series of manipulations, the above equation may be simplified as follows:

$$\min_x \left( \sum_{i \in S} \sum_{j \in S} x_i \left( \frac{k_i k_j}{2m} - A_{i,j} \right) x_j + \sum_{i \in S} x_i \left( 2 \sum_{j \in S} \left( \frac{k_i k_j}{2m} - A_{i,j} \right) \right) \right)$$

The above equation is a QUBO formulation of the modularity maximization problem for two clusters in an entire graph. The above equation may be manipulated such that the equation applies to a set of the nodes of the graph and multiple communities, such as the nodes of the node set 122 and the node clusters of the node cluster set 124. Based on an equation considering multiple clusters, a constraint may be added to the equation to indicate that the nodes may only belong to one node cluster at a time. The equation below represents a formulation of the equation above with the constraint:

$$\min_x \left( \sum_{l \in L} \left( \sum_{i \in S_l} \sum_{j \in S_l} x_{i,l} \left( \frac{k_i k_j}{2m} - A_{i,j} \right) x_{i,l} + \sum_{i \in S_l} x_{i,l} \left( 2 \sum_{j \in S} \left( \frac{k_i k_j}{2m} - A_{i,j} \right) \right) \right) + \gamma \sum_{i \in S_l} \left( \sum_{l \in L} x_{i,l} - 1 \right)^2 \right)$$

where l indicates a node cluster of the node cluster set 124, $S_l$ indicates the nodes for which a cluster l is a candidate, $x_{i,l}$ is the ith element of a vector $x_l$ that includes binary variables indicating the membership of all nodes to cluster l, and $\gamma$ is a penalty coefficient that imposes the constraint.

The above equation may be further written in matrix form and further manipulation performed that results in the following equation in the form of a QUBO that represents a modularity maximization problem:

$$\min_x (X^T (\mathcal{B}_{\mathcal{L} \times \mathcal{L}} + \gamma \varsigma^T) X + (2 \mathbb{1}_C^T \mathcal{B}_{C \times \mathcal{L}} - 2\gamma \varsigma^T) X)$$

where $\mathcal{B}_{\mathcal{L} \times C}$ and $\mathcal{B}_{\mathcal{L} \times \mathcal{L}}$ are block diagonal matrices with diagonal elements based on $$\frac{k_i k_j}{2m} - A_{i,j},$$

$\mathcal{L}$ is based on the number of node clusters in the node cluster set 124, and X is vector with a size equal to the number of node clusters in the node cluster set 124.

In some embodiments, at operation 140, a solution for the optimization problem 132 may be generated. A solution may be generated by providing the optimization problem 132 to a quantum processing system, a digital annealing system, or some other system configured to solve QUBO problems. The solution generated by solving the optimization problem 132 may be in the form of a vector and a value representing a modularity of the graph 112. The vector may indicate to which of the node clusters of the node cluster set 124 each of the nodes of the node set 122 are assigned.

In some embodiments, based on the vector, the assignments of the nodes to node clusters may be updated to generate a clustered graph 142. The clustered graph 142 may include an indication of to which node cluster each node is assigned. Note that for the first iteration of the operational flow 100, only the nodes in the node set 122 may be assigned to node clusters that are different than the node cluster originally assigned to each node in operation 110. Furthermore, the nodes of the node set 122 may only be assigned to node clusters in the node cluster set 124.

At operation 140, it may be determined if assignment of the nodes to node clusters based on the current configuration of the graph 112 may be further refined. In these and other embodiments, in response to a determination of further refinement, the clustered graph 142 may be provided to the operation 120. In these and other embodiments, in operation 120 a second node set 122 and a second node cluster set 124 may be defined. The second node set may include one or more nodes from the graph 112 that may not be included in the initial node set 122. Alternately or additionally, the second node cluster set 124 may include one or more node clusters that may not be included in the initial node cluster set 124.

In some embodiments, it may be determined to further refine the assignment of the nodes to node clusters based on a modularity of the graph 112 increasing in response to the reassignment of the nodes of the node set 122 among the node clusters of the node cluster set 124. In some embodiments, it may be determined to further refine the assignment of the nodes to node clusters based on a modularity of the graph 112 increasing by an amount that may satisfy a threshold.

In some embodiments, an amount of increase of the modularity of the graph 112 may be based on a value obtained by solving the optimization problem 132. Alternately or additionally, it may be determined to further refine the assignment of the nodes to node clusters in response to a number of iterations of the operational flow 100 satisfying a threshold or in response to an amount of processing time of the operational flow 100 satisfying a threshold. Alternately or additionally, some combination of factors such as iteration, processing time, and the modularity of the graph 112 may be used to determine whether to further refine the assignment of nodes to node clusters.

In some embodiments, in response to a determination to not further refine the assignment of the nodes to node clusters, the clustered graph 142 may be provided to the operation 150. At operation 150, the clustered graph 142 may be redefined. The clustered graph 142 may be redefined by merging the nodes assigned to the same node cluster into a single node to generate a redefined graph 152.

For example, if four nodes are assigned to the same node cluster, the four nodes may be merged into a single node in the redefined graph 152. In these and other embodiments, the edges between the four nodes may be removed such that they are not part of the redefined graph 152.

An example of a redefined graph 152 that may be generated by merging nodes is illustrated in the graph 230 of FIG. 2b. The graph 230 may be generated from the graph 200 of FIG. 2a by merging nodes of the graph 200 of FIG. 2a. For example, the nodes 203-205 may be grouped in a first node cluster, the nodes 206-208 may be grouped in a second node cluster, and the nodes 209-211 may be grouped in a third node cluster. As such, the nodes 203-205 may be grouped into a single node, the nodes 206-208 may be grouped into a single node, and the nodes 209-211 may be grouped into a single node. The single node resulting from the nodes 203-205 may be the node 232 of FIG. 2b. The single node resulting from the nodes 206-208 may be the node 236 of FIG. 2b and the single node resulting from the nodes 209-211 may be the node 234 of FIG. 2b. As illustrated in FIG. 2b, the number of edges between the nodes that are merged together are not illustrated.

In some embodiments, a value of the edges between the new single nodes may be based on some mathematical combination of the values of the edges that coupled nodes that form the new single nodes. For example, a value of the edge between the node 232 and 236 of FIG. 2b may be based on the values of the edges between the nodes 203-205 that formed the node 232 and the nodes 206-208 that formed the node 236. For example, the value of the edge between the node 232 and 236 of FIG. 2b may be a mathematical combination, such as a summation, mean, medium, mode, or some other mathematical combination, of the values of the edge between the node 204 and node 207 and the edge between node 204 and node 206.

Returning to the discussion of FIG. 1, the redefined graph 152 may be provided to the operation 120. At operation 120, a node set and a node cluster set may be selected from the redefined graph 152. The operational flow 100 may then proceed as described. In these and other embodiments, one or more clustered graphs may be generated based on the redefined graph until at operation 140 it is determined to not further refine the redefined graph. In these and other embodiments, the redefined graph may again be further redefined. For example, one or more nodes of the redefined graph that are assigned to the same node cluster may be merged.

An example of another redefined graph 152 that may be generated by merging nodes is illustrated in the graph 240 of FIG. 2c. The graph 240 may be generated from the graph 230 of FIG. 2b by merging nodes of the graph 230 of FIG. 2b. For example, the nodes 232 and 234 may be grouped in a first node cluster and the node 236 may be grouped in a second node cluster. As such, the nodes 232 and 234 may be grouped into a single node and, the node 236 may be grouped into a single node. The single node resulting from the nodes 232 and 234 may be the node 242 of FIG. 2c.

In some embodiments, the operational flow 100 may continue until at operation 140, it is determined to that no further refinement of the assignments of the nodes to node clusters or merging of node clusters is to be performed. In these and other embodiments, it may be determined to that no further refinement of the assignments of the nodes to node clusters or merging of node clusters is to be performed in response to the modularity value output as part of the solution to the optimization problem 132 satisfying a threshold for a first iteration of the operational flow 100 after generating a redefined graph. For example, during a first iteration of the operational flow 100 after a redefined graph 152 is generated and the solution to redefine the nodes of the redefined graph 152 indicates no increase in modularity, then the operational flow 100 may finish. Alternately or additionally, it may be determined to finish the operational flow 100 in response to a number of iterations of the operational flow 100 satisfying a threshold or in response to an amount of processing time of the operational flow 100 satisfying a threshold. Alternately or additionally, some combination of factors such as iteration, processing time, and the modularity of the graph 112 may be used to determine when to finish the operational flow 100.

In some embodiments, the redefined graph 152 that results when the operational flow 100 finishes may indicate a finalized grouping of the nodes of the network 102. In these and other embodiments, the nodes that are merged together to form the nodes in the final redefined graph 152 may be indicated as being grouped together by the operational flow 100. For example, with respect to FIGS. 2a and 2c, the nodes 202-205 and 209-211 may be grouped together and the nodes 206-208 may be grouped together by the operational flow 100. Thus, the operational flow 100 may determine communities of the nodes of the network 102.

Modifications, additions, or omissions may be made to the operational flow 100 without departing from the scope of the present disclosure. For example, in some embodiments, the operational flow 100 may include additional operations or fewer operations.

Figure 3:
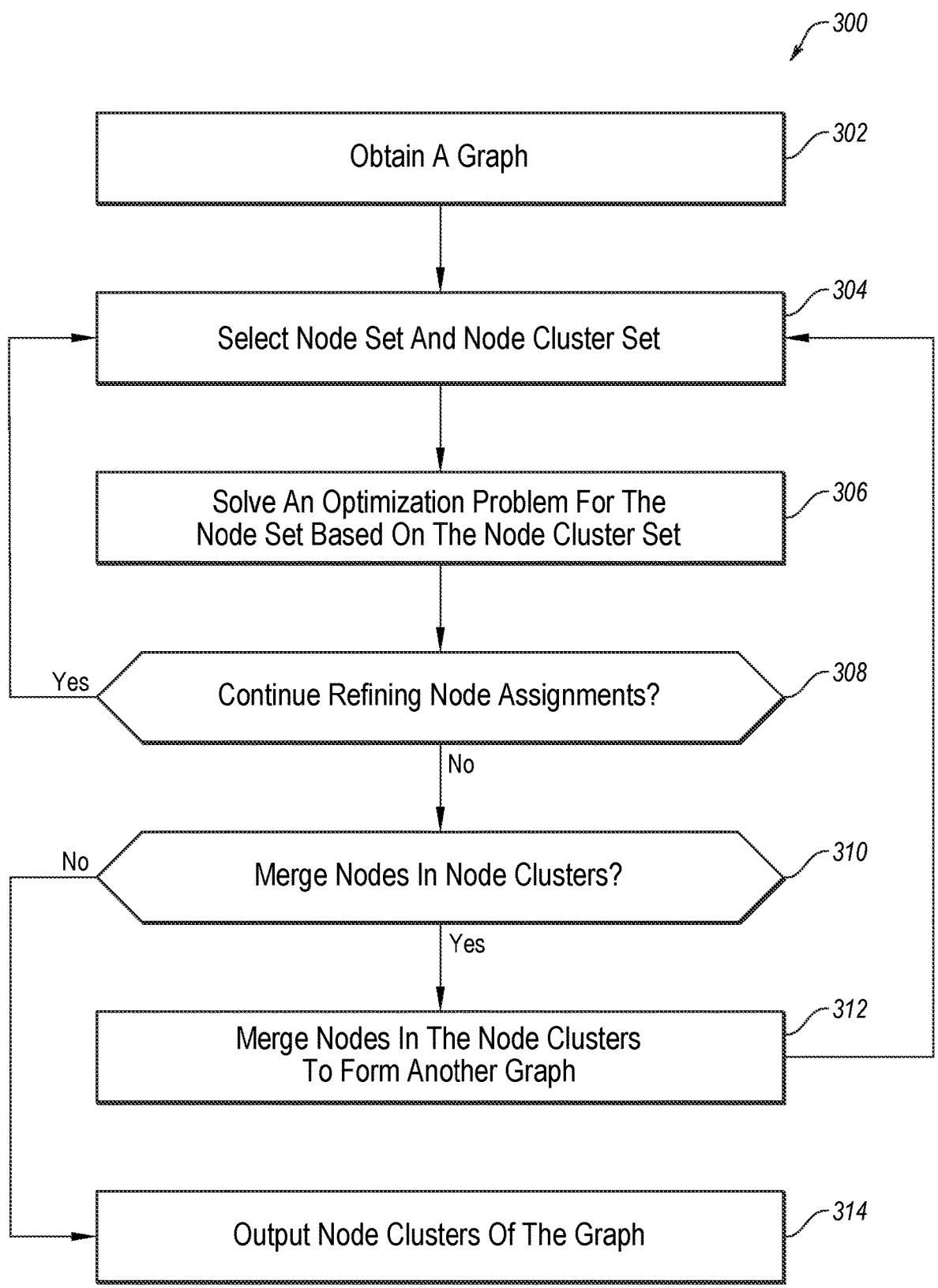
FIG. 3 illustrates a flowchart of an example method of grouping nodes of a network.

FIG. 3 illustrates a flowchart of an example method that may be used when clustering data. The method 300 may be arranged in accordance with at least one embodiment described in the present disclosure. One or more operations of the method 300 may be performed, in some embodiments, by a device or system, such as the system 500 of FIG. 5 or another device, combination of devices, system, or systems, such as those systems described with respect to FIG. 1. For example, one or more operations of the method 300 may be performed during the operation 110 of FIG. 1. In these and other embodiments, the method 300 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method may begin at block 302, where a graph may be obtained. The graph may include multiple nodes. In these and other embodiments, each node may be connected to at least one other node by at least one edge. The graph may be a representation of a network. In some embodiments, a node cluster may be assigned for each of the nodes in the graph. As such, a number of node clusters may be equal to a number of nodes in the graph.

At block 304, a node set and a node cluster set may be selected. In some embodiments, a number of nodes in the node set may be fewer than a number of nodes in the graph. The nodes selected for inclusion in the node set may be selected randomly, may be selected based on a breadth first search given a random or otherwise defined node in the graph, or may be selected using some other algorithm. The node clusters in the node cluster set may include the node clusters of each of the nodes in the node set. Alternately or additionally, the node clusters in the node cluster set may be selected based on an increase in modularity in response to grouping of the nodes in the node set in neighboring node clusters.

At block 306, an optimization problem for the node set may be solve based on the node cluster set. The optimization problem may be a maximization of modularity problem formulated as a quadratic unconstrained binary optimization problem. Alternately or additionally, the optimization problem may be another optimization problem formulated as a quadratic unconstrained binary optimization problem.

When the optimization problem is a maximization of modularity problem, the optimization problem may be defined based on the set of nodes, the set of node clusters, and the graph. In some embodiments, the optimization problem may be solved by reassigning one or more of the nodes of the set of nodes to different node clusters of the set of node clusters while maintaining assigned node clusters of the nodes that are not part of the set of nodes.

At block 308, it may be determined if node assignments to node clusters may be continued to be refined. In response to a determination to continue redefine node assignments to node clusters, the method 300 may proceed to block 304. In these and other embodiments, another set of nodes and another set of node clusters may be defined. The other set of nodes may include one or more nodes of the initial set of the nodes or may include no nodes of the initial set of nodes. The node clusters may include the nodes assigned thereto based on solving the optimization problem in block 306. In some embodiments, the determination to continue to redefine the node assignments to node clusters may be based on a change in modularity of the graph after reassigning nodes to different node clusters based on the solution to the optimization problem. For example, in response to a change in the modularity of the graph satisfying a threshold, it may be determined to continue to redefine node assignments to node clusters.

In response to not continuing to redefine node assignments to node clusters, the method 300 may proceed to block 310. At block 310, it may be determined if the nodes in the node clusters are to be merged. In response to merging the nodes in the node clusters, the method 300 may proceed to block 312. In response to not merging the nodes in the node clusters, the method 300 may proceed to block 314. In some embodiments, the determination to merge the nodes in the node clusters may be based on a change in modularity of the graph after reassigning nodes to different node clusters. For example, in response to a change in the modularity of the graph not satisfying a threshold after a particular number of iterations of solving the optimization problem, it may be determined to not merge the nodes of the node clusters. For example, it may be determined to not merge the nodes of the node clusters in response to the modularity of the graph not increasing for a first iteration of solving the optimization problem for a graph.

At block 312, nodes in the node clusters may be merged to form another graph. For example, the nodes that are assigned to first node clusters may be grouped together into a single node such that the edges between the nodes assigned to the first node cluster and the nodes are removed from the graph. Merging the nodes in the node clusters may result in another graph that is less granular than the initial graph.

At block 314, node clusters of the graph may be output. The nodes grouped together in the node clusters of the graph may represents the grouping of the nodes. Thus, a number of node clusters may represent a number of communities in the network represented by the graph. The nodes of a particular node cluster may represent the nodes that are part of the community represented by the particular node cluster. As described with respect to FIG. 3, a number of communities may not be defined prior to grouping the nodes of the graph into node clusters. Rather, the method 300 may select a number of communities based on the topology of the network as defined by the graph. Alternately or additionally, the size of the network may not limit the use of the method 300. Rather, a number of iterations that may be performed may be based on the size of the network, but hardware used to solve the optimization problem may not limit a size of the network for which the community detection may be performed.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Figure 4:
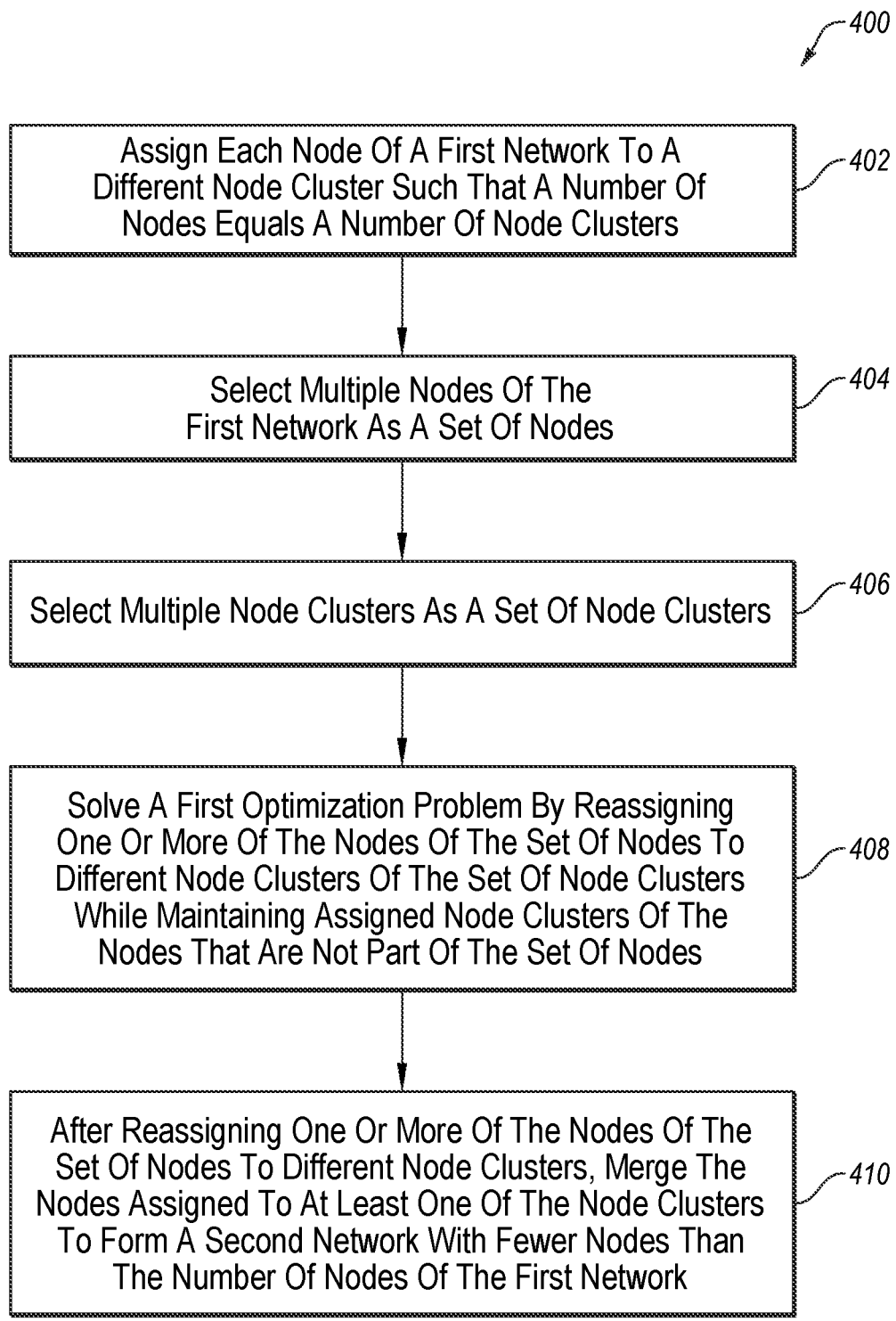
FIG. 4 illustrates a flowchart of another example method of grouping nodes of a network.

FIG. 4 illustrates a flowchart of another example method 400 that may be used when clustering data. The method 400 may be arranged in accordance with at least one embodiment described in the present disclosure. One or more operations of the method 400 may be performed, in some embodiments, by a device or system, such as the system 500 of FIG. 5 or another device, combination of devices, system, or systems, such as those systems described with respect to FIG. 1. For example, one or more operations of the method 400 may be performed during the operation 140 of FIG. 1. In these and other embodiments, the method 400 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method may begin at block 402, each node of a first network may be assigned to a different node cluster such that a number of nodes equals a number of node clusters.

At block 404, multiple nodes of the first network may be selected as a set of nodes. At block 406, multiple node clusters may be selected as a set of node clusters. In some embodiments, the set of node clusters may be selected based on the nodes in the set of nodes. Alternately or additionally, a number of node clusters in the set of node clusters may be greater than a number of nodes in the set of nodes.

At block 408, a first optimization problem may be solved by reassigning one or more of the nodes of the set of nodes to different node clusters of the set of node clusters while maintaining assigned node clusters of the nodes that are not part of the set of nodes.

At block 410, after reassigning one or more of the nodes of the set of nodes to different node clusters, the nodes assigned to at least one of the node clusters may be merged to form a second network with fewer nodes than the number of nodes of the first network.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Modifications, additions, or omissions may be made to FIG. 4 without departing from the scope of the present disclosure. For example, the method 400 may include obtaining neighboring nodes for each node in the first network. In these and other embodiments, the first optimization problem may be solved based on the neighboring nodes for each node in the set of nodes.

Alternately or additionally, the method 400 may further include after merging the nodes, selecting multiple nodes of the second network as a second set of nodes and selecting multiple node clusters as a second set of node clusters. The method 400 may further include resolving the first optimization problem by reassigning one or more of the nodes of the second set of nodes to different node clusters of the second set of node clusters while maintaining assigned node clusters of the nodes that are not part of the second set of nodes and after reassigning one or more of the nodes of the set of nodes to different node clusters, merging the nodes assigned to at least one of the second set of node clusters to form a third network with fewer nodes than a number of nodes of the second network.

In some embodiments, the method 400 may include constructing a formulation of the first optimization problem in a framework of a second optimization problem using the set of nodes, the set of node clusters, and the nodes of the first network. In some embodiments, the first optimization problem may be a maximization of modularity of the first network and the second optimization problem may be a quadratic unconstrained binary optimization problem.

In some embodiments, the method 400 may further include selecting multiple second nodes of the first network as a second set of nodes and selecting multiple second node clusters as a second set of node clusters. The method 400 may further include resolving the first optimization problem by reassigning one or more of the nodes of the second set of nodes to different node clusters of the second set of node clusters while maintaining assigned node clusters of the nodes that are not part of the second set of nodes. In these and other embodiments, the nodes assigned to at least one of the node clusters may be merged to form the second network after resolving the first optimization problem.

In these and other embodiments, the method 400 may further include repeating the steps of: selecting a second plurality of the nodes, selecting a second plurality of the node clusters, and resolving the first optimization problem until a change in modularity of the first network between subsequent iterations satisfies a threshold. In these and other embodiments, the method 400 may further include after merging the nodes, selecting multiple nodes of the second network as a second set of nodes and selecting multiple node clusters as a second set of node clusters. The method 400 may further include resolving the first optimization problem by reassigning one or more of the nodes of the second set of nodes to different node clusters of the second set of node clusters while maintaining assigned node clusters of the nodes that are not part of the second set of nodes.

Figure 5:
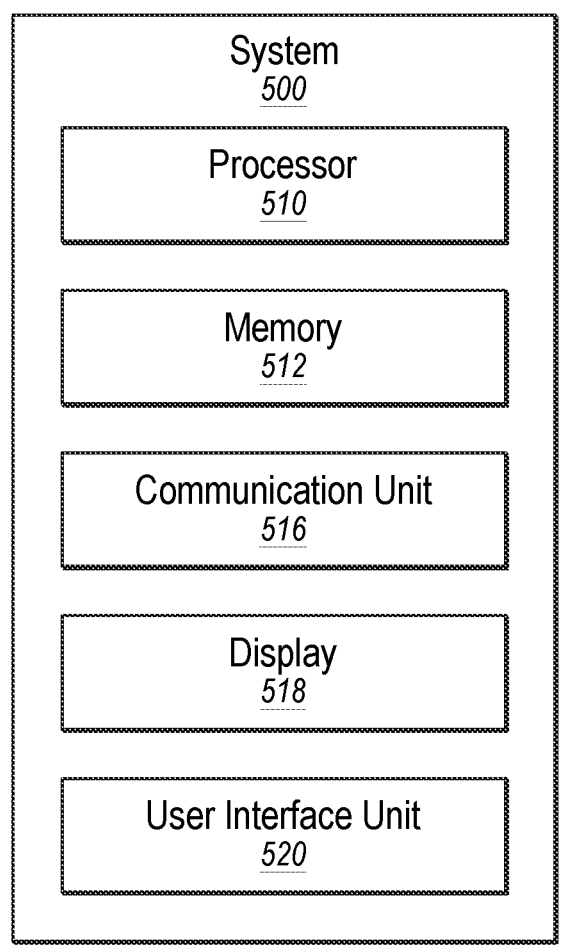
FIG. 5 illustrates an example system that may be used for data clustering.

FIG. 5 is a block diagram illustrating an example system 500 that may be used for data clustering, according to at least one embodiment of the present disclosure. The system 500 may include a processor 510, memory 512, a communication unit 516, a display 518, and a user interface unit 520, which all may be communicatively coupled. In some embodiments, the system 500 may be used to perform one or more of the methods described in this disclosure.

For example, the system 500 may be used to perform one or more of the operations in the operational flow 100 of FIG. 1.

Generally, the processor 510 may include any suitable special-purpose or general-purpose computer, computing entity, or processing device including various computer hardware or software modules and may be configured to execute instructions stored on any applicable computer-readable storage media. For example, the processor 510 may include a microprocessor, a microcontroller, a parallel processor such as a graphics processing unit (GPU) or tensor processing unit (TPU), a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 5, it is understood that the processor 510 may include any number of processors distributed across any number of networks or physical locations that are configured to perform individually or collectively any number of operations described herein. In some embodiments, the processor 510 may interpret and/or execute program instructions and/or process data stored in the memory 512. In some embodiments, the processor 510 may execute the program instructions stored in the memory 512.

For example, in some embodiments, the processor 510 may execute program instructions stored in the memory 512 that are related to task execution such that the system 500 may perform or direct the performance of the operations associated therewith as directed by the instructions. In these and other embodiments, the instructions may be used to perform one or more operations of FIG. 1, one or more blocks of method 300 of FIG. 3, or one or more blocks of method 400 of FIG. 4.

The memory 512 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 510.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media.

Computer-executable instructions may include, for example, instructions and data configured to cause the processor 510 to perform a certain operation or group of operations as described in this disclosure. In these and other embodiments, the term "non-transitory" as explained in the present disclosure should be construed to exclude only those types of transitory media that were found to fall outside the scope of patentable subject matter in the Federal Circuit decision of *In re Nuijten*, 500 F.3d 1346 (Fed. Cir. 2007). Combinations of the above may also be included within the scope of computer-readable media.

The communication unit 516 may include any component, device, system, or combination thereof that is configured to transmit or receive information over a network. In some embodiments, the communication unit 516 may communicate with other devices at other locations, the same location, or even other components within the same system. For example, the communication unit 516 may include a modem, a network card (wireless or wired), an infrared communication device, a wireless communication device (such as an antenna), and/or chipset (such as a Bluetooth® device, an 802.6 device (e.g., Metropolitan Area Network (MAN)), a WiFi device, a WiMax device, cellular communication facilities, etc.), and/or the like. The communication unit 516 may permit data to be exchanged with a network and/or any other devices or systems described in the present disclosure.

The display 518 may be configured as one or more displays, like an LCD, LED, Braille terminal, or other type of display. The display 518 may be configured to present video, text captions, user interfaces, and other data as directed by the processor 510.

The user interface unit 520 may include any device to allow a user to interface with the system 500. For example, the user interface unit 520 may include a mouse, a track pad, a keyboard, buttons, camera, and/or a touchscreen, among other devices. The user interface unit 520 may receive input from a user and provide the input to the processor 510. In some embodiments, the user interface unit 520 and the display 518 may be combined.

Modifications, additions, or omissions may be made to the system 500 without departing from the scope of the present disclosure. For example, in some embodiments, the system 500 may include any number of other components that may not be explicitly illustrated or described. Further, depending on certain implementations, the system 500 may not include one or more of the components illustrated and described.

As indicated above, the embodiments described herein may include the use of a special purpose or general-purpose computer (e.g., the processor 510 of FIG. 5) including various computer hardware or software modules, as discussed in greater detail below. Further, as indicated above, embodiments described herein may be implemented using computer-readable media (e.g., the memory 512 of FIG. 5) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method comprising:
    assigning each node of a first network to a different node cluster such that a number of nodes equals a number of node clusters;
    selecting a plurality of the nodes of the first network as a set of nodes;
    selecting a plurality of the node clusters as a set of node clusters;
    solving a first optimization problem by reassigning one or more of the nodes of the set of nodes to different node clusters of the set of node clusters while maintaining assigned node clusters of the nodes that are not part of the set of nodes; and
    after reassigning one or more of the nodes of the set of nodes to different node clusters, merging the nodes assigned to at least one of the node clusters to form a second network with fewer nodes than the number of nodes of the first network.

2. The method of claim 1, further comprising constructing a formulation of the first optimization problem in a framework of a second optimization problem using the set of nodes, the set of node clusters, and the nodes of the first network.

3. The method of claim 2, wherein the first optimization problem is a maximization of modularity of the first network and the second optimization problem is a quadratic unconstrained binary optimization problem.

4. The method of claim 1, further comprising:
    selecting a second plurality of the nodes of the first network as a second set of nodes;
    selecting a second plurality of the node clusters as a second set of node clusters; and
    resolving the first optimization problem by reassigning one or more of the nodes of the second set of nodes to different node clusters of the second set of node clusters while maintaining assigned node clusters of the nodes that are not part of the second set of nodes,
    wherein the nodes assigned to at least one of the node clusters are merged to form the second network after resolving the first optimization problem.

5. The method of claim 4, further comprising repeating the steps of: selecting a second plurality of the nodes, selecting a second plurality of the node clusters, and resolving the first optimization problem until a change in modularity of the first network between subsequent iterations satisfies a threshold.

6. The method of claim 4, further comprising:
    after merging the nodes, selecting a plurality of the nodes of the second network as a third set of nodes;
    after merging the nodes, selecting a third plurality of the node clusters as a third set of node clusters; and
    resolving the first optimization problem by reassigning one or more of the nodes of the third set of nodes to different node clusters of the third set of node clusters while maintaining assigned node clusters of the nodes that are not part of the third set of nodes.

7. The method of claim 1, further comprising:
    after merging the nodes, selecting a plurality of the nodes of the second network as a second set of nodes;
    after merging the nodes, selecting a second plurality of the node clusters as a second set of node clusters; and
    resolving the first optimization problem by reassigning one or more of the nodes of the second set of nodes to different node clusters of the second set of node clusters while maintaining assigned node clusters of the nodes that are not part of the second set of nodes; and
    after reassigning one or more of the nodes of the set of nodes to different node clusters, merging the nodes assigned to at least one of the second set of node clusters to form a third network with fewer nodes than a number of nodes of the second network.

8. The method of claim 1, further comprising obtaining neighboring nodes for each node in the first network, wherein the first optimization problem is solved based on the neighboring nodes for each node in the set of nodes.

9. The method of claim 1, wherein the set of node clusters are selected based on the nodes in the set of nodes.

10. The method of claim 9, wherein a number of node clusters in the set of node clusters is greater than a number of nodes in the set of nodes.

11. One or more non-transitory computer-readable storage media configured to store instructions that, in response to being executed, cause a system to perform the method of claim 1.

12. A system comprising:
    one or more computer-readable storage media configured to store instructions; and
    one or more processors communicatively coupled to the one or more computer-readable storage media and configured to, in response to execution of the instructions, cause the system to perform operations, the operations comprising:
    assign each node of a first network to a different node cluster such that a number of nodes equals a number of node clusters;
    select a plurality of the nodes of the first network as a set of nodes;
    select a plurality of the node clusters as a set of node clusters;
    direct a first optimization problem to be solved by reassigning one or more of the nodes of the set of nodes to different node clusters of the set of node clusters while maintaining assigned node clusters of the nodes that are not part of the set of nodes; and
    after reassigning one or more of the nodes of the set of nodes to different node clusters, merge the nodes assigned to at least one of the node clusters to form a second network with fewer nodes than the number of nodes of the first network.

13. The system of claim 12, wherein the operations further comprise constructing a formulation of the first optimization problem in a framework of a second optimization problem using the set of nodes, the set of node clusters, and the nodes of the first network.

14. The system of claim 13, wherein the first optimization problem is a maximization of modularity of the first network and the second optimization problem is a quadratic unconstrained binary optimization problem.

15. The system of claim 12, wherein the operations further comprise:
    select a second plurality of the nodes of the first network as a second set of nodes;

select a second plurality of the node clusters as a second set of node clusters; and direct the first optimization problem to be resolved by reassigning one or more of the nodes of the second set of nodes to different node clusters of the second set of node clusters while maintaining assigned node clusters of the nodes that are not part of the second set of nodes, wherein the nodes assigned to at least one of the node clusters are merged to form the second network after resolving the first optimization problem.

16. The system of claim 15, wherein the operations further comprise repeat the operations of: select a second plurality of the nodes, select a second plurality of the node clusters, and resolve the first optimization problem until a change in modularity of the first network between subsequent iterations satisfies a threshold.

17. The system of claim 15, wherein the operations further comprise:

after merging the nodes, select a plurality of the nodes of the second network as a third set of nodes;

after merging the nodes, select a third plurality of the node clusters as a third set of node clusters; and direct the first optimization problem to be resolved by reassigning one or more of the nodes of the third set of nodes to different node clusters of the third set of node clusters while maintaining assigned node clusters of the nodes that are not part of the third set of nodes.

18. The system of claim 12, wherein the operations further comprise:

after merging the nodes, select a plurality of the nodes of the second network as a second set of nodes;

after merging the nodes, select a second plurality of the node clusters as a second set of node clusters; and direct the first optimization problem to be resolved by reassigning one or more of the nodes of the second set of nodes to different node clusters of the second set of node clusters while maintaining assigned node clusters of the nodes that are not part of the second set of nodes; and after reassigning one or more of the nodes of the set of nodes to different node clusters, merge the nodes assigned to at least one of the second set of node clusters to form a third network with fewer nodes than a number of nodes of the second network.

19. The system of claim 12, wherein the set of node clusters are selected based on the nodes in the set of nodes.

20. The system of claim 12, wherein a number of node clusters in the set of node clusters is greater than a number of nodes in the set of nodes.

* * * * *